(12) United States Patent
Kay

(10) Patent No.: US 6,378,658 B1
(45) Date of Patent: Apr. 30, 2002

(54) CONTINUOUS LUBRICATING SYSTEM

(75) Inventor: Joseph A. Kay, Highland, MI (US)

(73) Assignee: Meritor Heavy Vehicle Technology, L.L.C., Troy, MI (US)

( * ) Notice: Subject to any disclaimer, the term of this patent is extended or adjusted under 35 U.S.C. 154(b) by 0 days.

(21) Appl. No.: 09/568,271

(22) Filed: May 10, 2000

(51) Int. Cl.[7] .......................... F01M 11/04; F16N 21/00
(52) U.S. Cl. ................... 184/105.2; 188/264 B
(58) Field of Search ........................ 184/105.2, 105.3, 184/105.1; 188/79.55, 264 B, 72.7, 72.9, 329, 330, 343, 209

(56) References Cited

U.S. PATENT DOCUMENTS

| | | |
|---|---|---|
| 3,981,281 A | 9/1976 | Deschler et al. |
| 4,069,794 A | 1/1978 | Jordan |
| 4,080,108 A | 3/1978 | Keske et al. |
| 4,777,842 A | 10/1988 | Yamada |
| 4,813,516 A * | 3/1989 | Urban ..................... 188/79.55 |
| 4,883,027 A | 11/1989 | Oikawa et al. |
| 4,890,939 A * | 1/1990 | Koschinat .................... 384/322 |
| 5,316,115 A * | 5/1994 | Urban ........................ 188/325 |
| 5,964,449 A | 10/1999 | Goettel et al. |

FOREIGN PATENT DOCUMENTS

DE    3238351 A1 *   4/1984

* cited by examiner

Primary Examiner—David Fenstermacher
(74) Attorney, Agent, or Firm—Carlson, Gaskey & Olds

(57) ABSTRACT

A system continuously lubricates critical areas, such as bushings and seals, in a cam brake shaft. A fresh source of lubrication is provided at a generally constant pressure. This is accomplished using a centrally located spring and an adjacent pair of axially sliding inboard seals that apply a continuous pressure to strategically disposed lubricating fluid between each of a pair of main seals at each end of the tubular cam housing and a respective inboard seal positioned at an end of the centrally located spring.

13 Claims, 1 Drawing Sheet

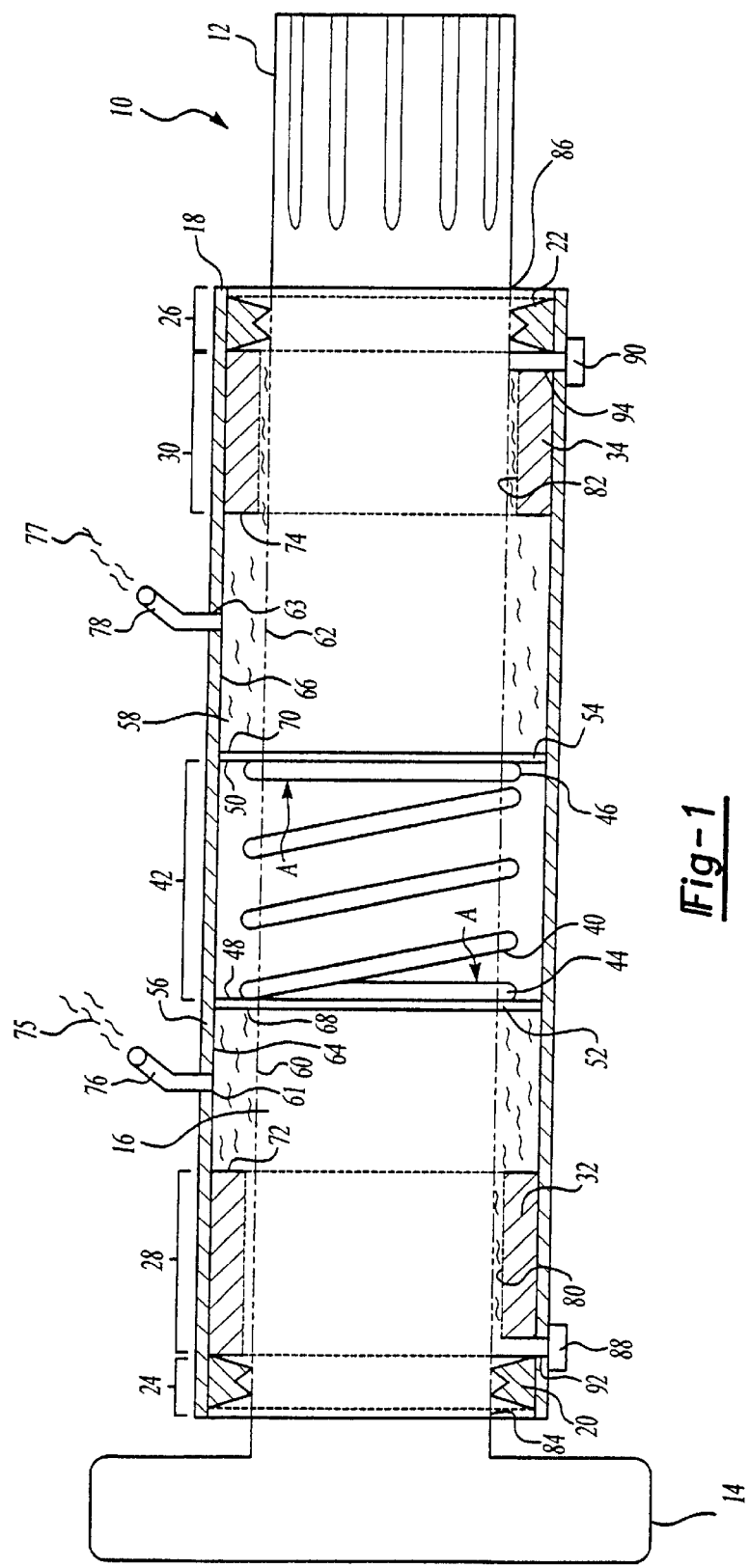

CONTINUOUS LUBRICATING SYSTEM

BACKGROUND OF THE INVENTION

This invention relates to a system for continuously lubricating critical areas on a shaft including bushings and seals. Most preferably, the invention is used on a cam brake shaft.

Typically, a cam brake shaft comprises an inside end that is driven to rotate in response to braking input by a vehicle operator, an outer cam end that rotates and forces outward movement of brake pads into a respective wheel. The shaft rotates within a tubular cam shaft housing. The tubular cam shaft housing is lined in part with a plurality of bushings and has at least one seal positioned at either end.

The design of cam brake shaft systems presents many challenges. One such challenge occurs with respect to keeping the cam shaft properly lubricated, and particularly in the bushing and seal areas of the cam housing. Over time, grease or other lubricant tends to escape the bearing areas. This has often required periodic refreshing of the lubricant. Lack of consistent lubrication at these critical areas can lead to malfunctioning components or even seizure. A well lubricated cam brake shaft ultimately results in a longer life for the cam brake shaft elements.

It would be desirable to provide a cam brake shaft with a system for continuously supplying a fresh source of lubrication to the critical bushing and seal areas of the cam brake shaft.

SUMMARY OF THE INVENTION

In the disclosed embodiment of this invention, a cam brake shaft is provided with a system for continuously supplying a fresh source of lubrication to the critical bushing and seal areas of the cam brake shaft at a generally constant pressure. This is accomplished using a centrally located bias element, such as a spring, and an adjacent pair of axially sliding inboard seals. The biased inboard seals apply a continuous pressure to lubricating fluid between a pair of main seals at each end of the tubular cam housing and respective ones of the inboard seals positioned at ends of the centrally located spring.

An elongate portion of the cam brake shaft that lies between the inner and outer ends rotates within a hollow tubular cam housing. A main seal is provided within each of the two housing ends. Next to each main seal, axially inward of the cam housing is each of a pair of laterally spaced bushings. The bushings guide the elongate portion of the cam shaft.

In the interior of the cam housing there is a tubular shaped space surrounding the elongate portion of the cam shaft between the laterally spaced bushings. The bias spring is coiled about a midsection of the elongate portion of the cam shaft within the tubular shaped space. The spring has two ends, each of which abuts the axially sliding inboard seals. Thus the tubular shaped space is generally segmented into three portions. There is the central portion which houses the spring and abutting inboard seals, and two laterally spaced outward tubular shaped areas. Each outward tubular shaped area is positioned between each sliding inboard seal and its respective bushing.

Lubricating fluid is introduced to the cam shaft housing by way of a pair of inlet fittings, each positioned in the area of the laterally spaced outward tubular shaped areas. Thus, lubricating fluid enters each outwardly spaced tubular shaped area, and exerts a compressive force on the spring through the sliding inboard seals.

As the spring resists the compressive force, it exerts an opposing force on each of the two sliding inboard seals. This, in turn, forces the lubricating fluid in opposing directions towards each laterally spaced bushing where it lubricates the inner bushing surfaces as the cam shaft rotates. Over time, as the vehicle brake is applied and released and as lubricating fluid seeps out past the laterally spaced main seals, fresh lubricating fluid is forced between cam shaft and bushing surfaces and against the main seals. An air purge may need to take place initially. Air purge devices may be located at an opening in the cam housing positioned in the area of each bushing.

These and other features of the present invention can be best understood from the following specification and drawing, the following of which is a brief description.

BRIEF DESCRIPTION OF THE DRAWING

FIG. 1 schematically shows a longitudinal cross sectional view of a cam brake shaft incorporating the continuous lubricating system of the present invention.

DETAILED DESCRIPTION OF THE DRAWING

As shown schematically in the FIGURE, cam brake shaft 10 generally comprises an inner end that is driven to rotate 12, an outer rotating cam end 14 which forces outward movement of respective brake pads into a respective wheel, and an elongate cylindrical shaft portion 16 that extends between the ends. Elongate cylindrical shaft portion 16 rotates during vehicle brake actuation within tubular cam shaft housing 18. Tubular cam shaft housing 18 is provided with a pair of laterally spaced main seals 20, 22 positioned circumferentially around cylindrical shaft portion 16 within extreme end portions 24, 26 of cam shaft housing 18. Cam shaft housing 18 further includes a pair of laterally spaced inner end portions 28, 30 defined axially inwardly from end portions 24, 26 and are lined with respective laterally spaced bushing elements 32,34. Bushing elements 32, 34 guide the rotating cylindrical shaft portion 16.

The continuous lubricating system of the present invention includes a spring 40 that is coiled about the cylindrical shaft portion 16 within the midsection 42 of cam shaft housing 18. The spring coil 40 has two laterally spaced ends 44, 46 that abut inner surfaces 48, 50 of a pair of axially sliding inboard seals 52, 54 respectively. Sliding inboard seals 52, 54 extend circumferentially around, and are slidable along, cylindrical shaft portion 16 within cam housing 18.

A pair of laterally spaced tubular shaped areas 56, 58 are defined, respectively, by exterior surface segments 60, 62 of cylindrical shaft portion 16, internal surface segments 64,66 of tubular cam shaft housing 18, outer surfaces 68, 70 of sliding inboard seals 52, 54, and axially inwardly facing surfaces 72, 74 of bushing elements 32, 34.

Lubricating fluid 75, 77 is introduced to cylindrical shaft portion 16 through openings 61, 63 in the cam housing 18 by way of a pair of inlet fittings 76, 78. Inlet fittings 76, 78 are positioned to pump lubricating fluid 75, 77 into laterally spaced tubular shaped areas 56, 58, thereby exerting a compressive force on spring 40 by way of sliding inboard seals 52, 54. As spring 40 resists the compressive force of the pumped fluid 75, 77, it exerts an opposing force, as shown by arrows A, on each of the sliding inboard seals 52, 54. This, in turn, forces the lubricating fluid 75, 77 in opposing directions toward each laterally spaced bushing 32, 34 where it lubricates respective inner bushing surfaces 80, 82 as cylindrical shaft portion 16 rotates. Over time, lubricating fluid 75, 77 seeps past laterally spaced main seals 20, 22 and exits the tubular cam housing 18 at points 84, 86. Air purge devices 88, 90 may be located at openings 92, 94 in the cam shaft housing 18 positioned in the area of laterally spaced inner end portions 28, 30, since an air purge will need to take place initially.

Over time, as the vehicle brake is applied and released, cam brake shaft 10 is driven to rotate while lubricating fluid 75, 77 seeps past main seals 20, 22 and out of cam shaft housing 18 at points 84, 86. At the same time, a fresh supply of lubricating fluid 75, 77 is forced between outer cam shaft surfaces 60, 62 and inner bushing surfaces 80, 82 and against main seals 20, 22. Thus, a continuous flow of fresh lubricant is maintained.

When the cam brake shaft 10 is initially assembled, lubricant is supplied through the fitting 76 and 78 into areas 56 and 58. In the inlet fitting 76 and 78 are then closed. The size of the areas 56 and 58 is selected to be sufficiently large such that an adequate supply of lubricant will be stored after this initial supply so that replenishing of the lubricant will not be necessary for a very long time, if at all during the useful life of the cam brake shaft.

Further, while a coil spring 40 is disclosed, other biased elements could be substituted. Also, while the invention is specifically disclosed in a cam brake shaft, other types of rotating shafts may benefit from this invention.

A preferred embodiment of this invention has been disclosed. However, a worker of ordinary skill in this art would recognize that certain modifications would come within the scope of this invention. For that reason, the following claims should be studied to determine the true scope and content of this invention.

What is claimed is:

1. A cam brake shaft for a vehicle braking system comprising:
    an inner end driven to rotate, and an outer cam end;
    an elongate cylindrical shaft portion extending between said inner end and said outer end;
    a housing in which said cylindrical shaft portion rotates, said housing having a central portion and ends associated with said shaft inner end, and said shaft outer end; and
    a lubricating system for continuously urging fresh lubricating fluid between central position and said ends of said housing.

2. A cam brake shaft as recited in claim 1, wherein said tubular housing has an inner tubular surface and includes two laterally spaced extreme end portions and two laterally spaced inner end portions that abut said extreme end portions, said extreme end portions each housing a main seal positioned circumferentially around said cylinder shaft portion, said inner end portions each being lined with a bushing element having an inner surface, wherein said lubricating system forces lubricating fluid between the inner surfaces of said bushing elements and respective adjacent segments of said rotating cylindrical shaft portion and outwards towards each of said main seals.

3. A cam brake as recited in claim 1, wherein said bias element continuously urges said lubricating fluid.

4. A cam brake shaft as recited in claim 3, wherein said bias element is a coil spring.

5. A cam brake shaft for a vehicle braking system comprising:
    an inner end driven to rotate, and an outer cam end;
    an elongate cylindrical shaft portion extending between said inner end and said outer end;
    a tubular housing in which said cylindrical shaft portion rotates; and
    a lubricating system for continuously urging fresh lubricating fluid between outside portions of said rotating cylindrical shaft portion and inside portions of said tubular housing wherein said tubular housing has an inner tubular surface and includes two laterally spaced extreme end portions and two laterally spaced inner end portions that abut said extreme end portions, said extreme end portions each housing a main seal positioned circumferentially around said cylinder shaft portion, said inner end portions each being lined with a bushing element having an inner surface, wherein said lubricating system forces lubricating fluid between the inner surfaces of said bushing elements and respective adjacent segments of said rotating cylindrical shaft portion and outwards towards each of said main seals, and wherein said tubular housing has a midsection and said lubricating system includes a spring having two laterally spaced ends, said spring being coiled about the cylindrical shaft portion and housed within said midsection of said tubular housing, and a pair of axially sliding inboard seals each positioned adjacent to an end of said spring, and lubricant between said main seals and said inboard seals.

6. A cam brake shaft as recited in claim 5, wherein openings are positioned receive pumped lubricating fluid between each of said sliding inboard seals and each respective adjacent bushing.

7. A lubricating system for continuously pumping fresh lubricating fluid between an outer portion of a rotating cylindrical shaft and an inner portion of a shaft housing;
    said shaft housing having an inner surface and including two laterally spaced extreme end portions and two laterally spaced inner end portions that abut said extreme end portions;
    said extreme end portions each housing a main seal positioned circumferentially around said cylinder shaft portion; and
    said inner end portions each being lined with a bushing element having an inner surface wherein said lubricating system forces lubricating fluid between the inner surfaces of said bushing elements and respective adjacent segments of said rotating cylindrical shaft and outwards towards each of said main seals.

8. A lubricating system as recited in claim 7, wherein said housing has a midsection and said lubricating system has a spring with two laterally spaced ends, said spring being coiled about the cylindrical shaft and housed within said midsection of said housing, a pair of axially sliding inboard seals each positioned adjacent to an end of said spring, and lubricant between said main seals and said inboard seals.

9. A lubricating system as recited in claim 8, wherein openings are positioned to receive pumped lubricating fluid between each of said sliding inboard seals and each respective adjacent bushing.

10. A lubricating system as recited in claim 7, wherein said bias element continuously forces said lubricating fluid.

11. A lubricating system as recited in claim 10, wherein said bias element is a coil spring.

12. A cam brake shaft for a vehicle braking system comprising:
    an inner end driven to rotate and an outer cam end;
    an elongate cylindrical shaft portion extending between said inner and said outer end;
    a tubular housing in which cylindrical shaft portion rotates, and a pair of bushings, with one of said bushings being received in said tubular housing near each of two ends of said tubular housing;

a pair of lubricant containing chambers for supplying lubricant to each of said bushings, and a pair of centrally located inboard seals for defining a central boundary to said lubricant chambers, and a bias element for forcing each of said inboard seals toward an end of said tubular housing to continuously urge lubricant toward each said bushing.

13. A cam brake as recited in claim 12, wherein a single spring forces each of said inboard seals outwardly.

* * * * *